United States Patent
Yang et al.

(10) Patent No.: US 6,550,962 B1
(45) Date of Patent: Apr. 22, 2003

(54) TEMPERATURE MONITORING ASSEMBLY HAVING A THERMOSTATIC CONTROL WITH MOUNTING CLIP

(75) Inventors: Tung-Sheng Yang, Mansfield, OH (US); James Krillenberger, Bellville, OH (US); Larry Russell, Lexington, OH (US); Bradley Funk, Mansfield, OH (US); Jeffrey Mueck, Mansfield, OH (US); Donald Cunitz, Mansfield, OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 0 days.

(21) Appl. No.: 09/675,439

(22) Filed: Sep. 28, 2000

(51) Int. Cl.⁷ .............................. G01K 1/14; G01K 1/08; A44B 21/00
(52) U.S. Cl. ........................ 374/147; 374/163; 374/208; 24/458
(58) Field of Search ................................. 374/208, 141, 374/147, 148; 24/543, 458; 248/73, 229.26, 74.2

(56) References Cited

U.S. PATENT DOCUMENTS

| | | | |
|---|---|---|---|
| 2,302,640 A | | 11/1942 | Schmidt |
| 2,972,461 A | * | 2/1961 | Balbach et al. |
| 2,996,275 A | * | 8/1961 | Holton |
| 3,397,333 A | | 8/1968 | Jastram et al. |
| 3,511,091 A | | 5/1970 | Thome |
| 3,515,363 A | * | 6/1970 | Fisher |
| 4,091,672 A | | 5/1978 | Amrine et al. |
| 4,119,285 A | * | 10/1978 | Bisping et al. ................ 248/72 |
| 4,297,668 A | * | 10/1981 | Place ........................... 337/365 |
| 4,386,752 A | * | 6/1983 | Pavlak et al. .................. 248/73 |
| 4,570,303 A | * | 2/1986 | Richmond et al. ......... 24/16 PB |
| 4,575,258 A | | 3/1986 | Wall |
| 4,671,033 A | * | 6/1987 | Smith ........................... 52/220 |
| 5,016,843 A | * | 5/1991 | Ward .......................... 248/68.1 |
| 5,046,447 A | * | 9/1991 | Steinke et al. ............... 116/217 |
| 5,108,055 A | * | 4/1992 | Kreinberg et al. ............. 248/71 |
| 5,125,069 A | * | 6/1992 | O'Boyle ...................... 392/465 |
| 5,164,545 A | * | 11/1992 | Kreinberg et al. ......... 174/94 R |
| 5,251,857 A | * | 10/1993 | Grice et al. .................... 248/62 |
| 5,307,543 A | | 5/1994 | Krillenberger |
| 5,360,241 A | | 11/1994 | Gundy |
| 5,382,093 A | | 1/1995 | Dutcher |
| 5,454,641 A | | 10/1995 | Parker et al. |
| 5,772,160 A | * | 6/1998 | Gordon ....................... 248/68.1 |
| 5,898,975 A | * | 5/1999 | Hancock ..................... 16/114 R |
| 6,216,986 B1 | * | 4/2001 | Kwilosz ...................... 248/74.1 |
| 6,334,707 B1 | * | 1/2002 | Ku ............................... 374/208 |
| 6,417,758 B1 | * | 7/2002 | Russel et al. ................ 337/380 |

* cited by examiner

Primary Examiner—Diego Gutierrez
Assistant Examiner—Gail Verbitsky
(74) Attorney, Agent, or Firm—Harness, Dickey & Pierce, P.L.C.

(57) ABSTRACT

A thermal sensor incorporating an improved retention clip is disclosed herein. The improved retention clip is both easily fabricated from either sheet stock or wire stock and is designed to be easily and securely assembled to the sensor housing and provides a convenient easy to use retention system for attaching the sensor to a tubular or generally cylindrical conduit member. The retention clip includes a gently angled lead-in portion which aids in guiding the clip into the conduit with little force coupled with a more sharply angled retention portion that substantially increases the force required to dislodge the sensor once assembled. Additionally, the clips are designed to minimize contact surface engagement with the conduit so as to minimize crevice corrosion. Portions of the clips may be covered with a suitable material to further limit the possibility of localized corrosion as well as to insulate the clip from the conduit member while also resisting relative movement therebetween. An optional protector disc is also disclosed which serves to provide increased protection against damage to the sensor body.

47 Claims, 7 Drawing Sheets

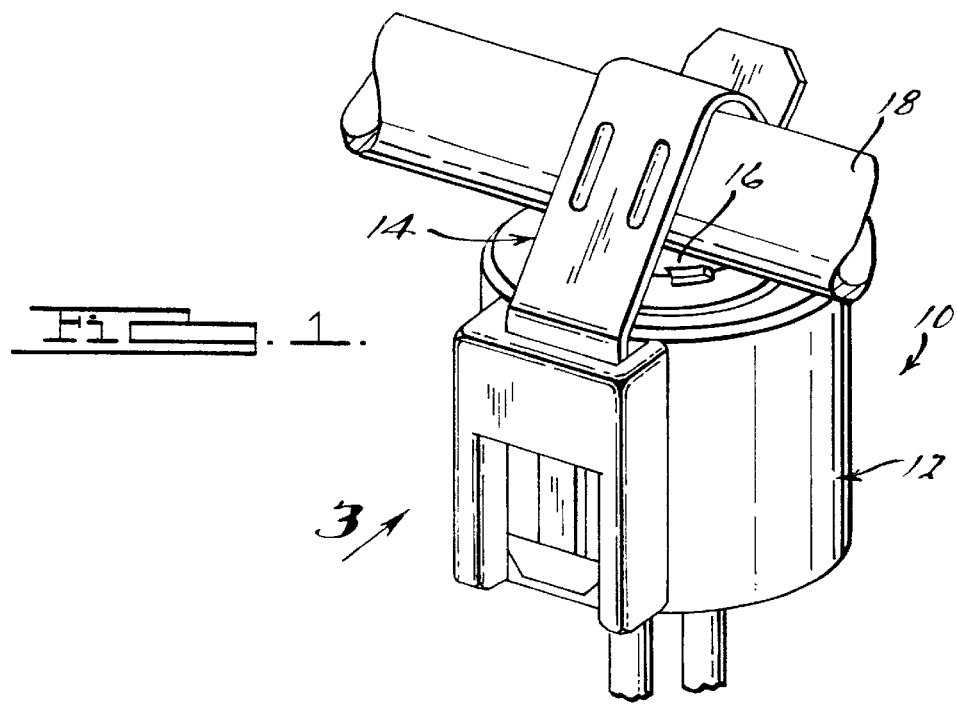
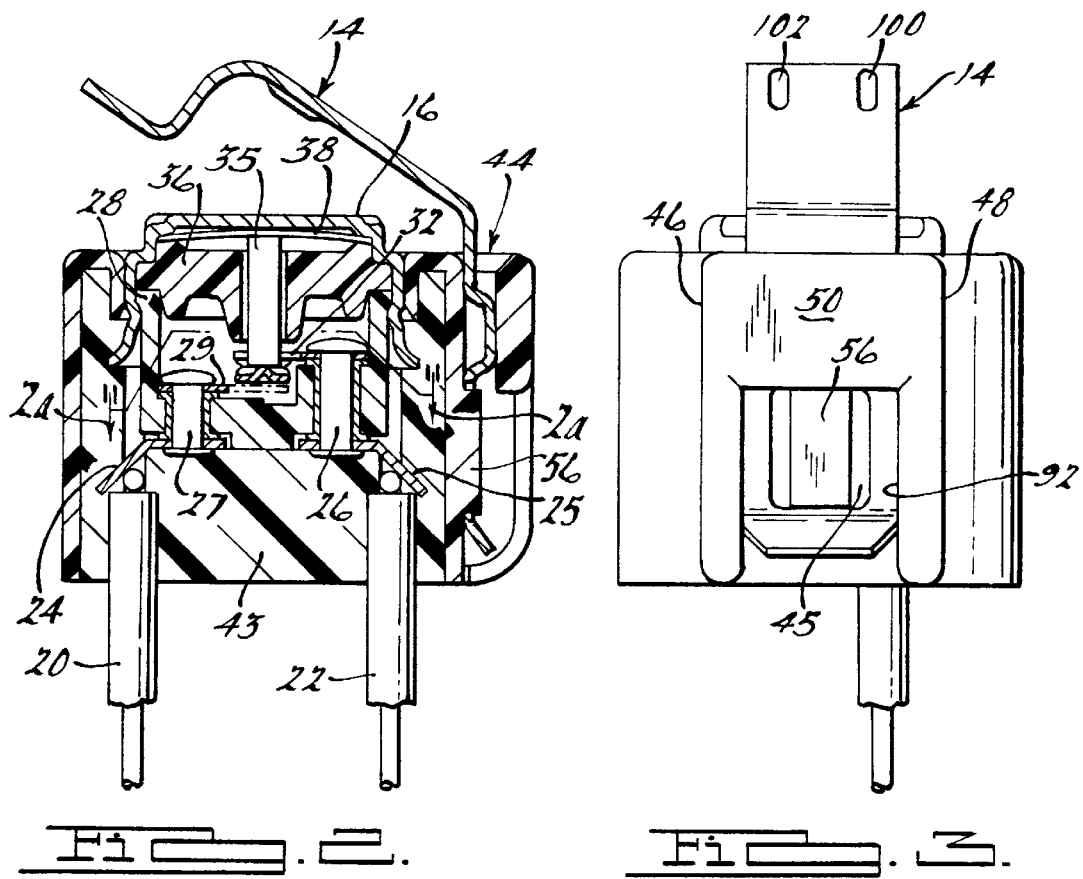
Fig. 1.
Fig. 2.
Fig. 3.

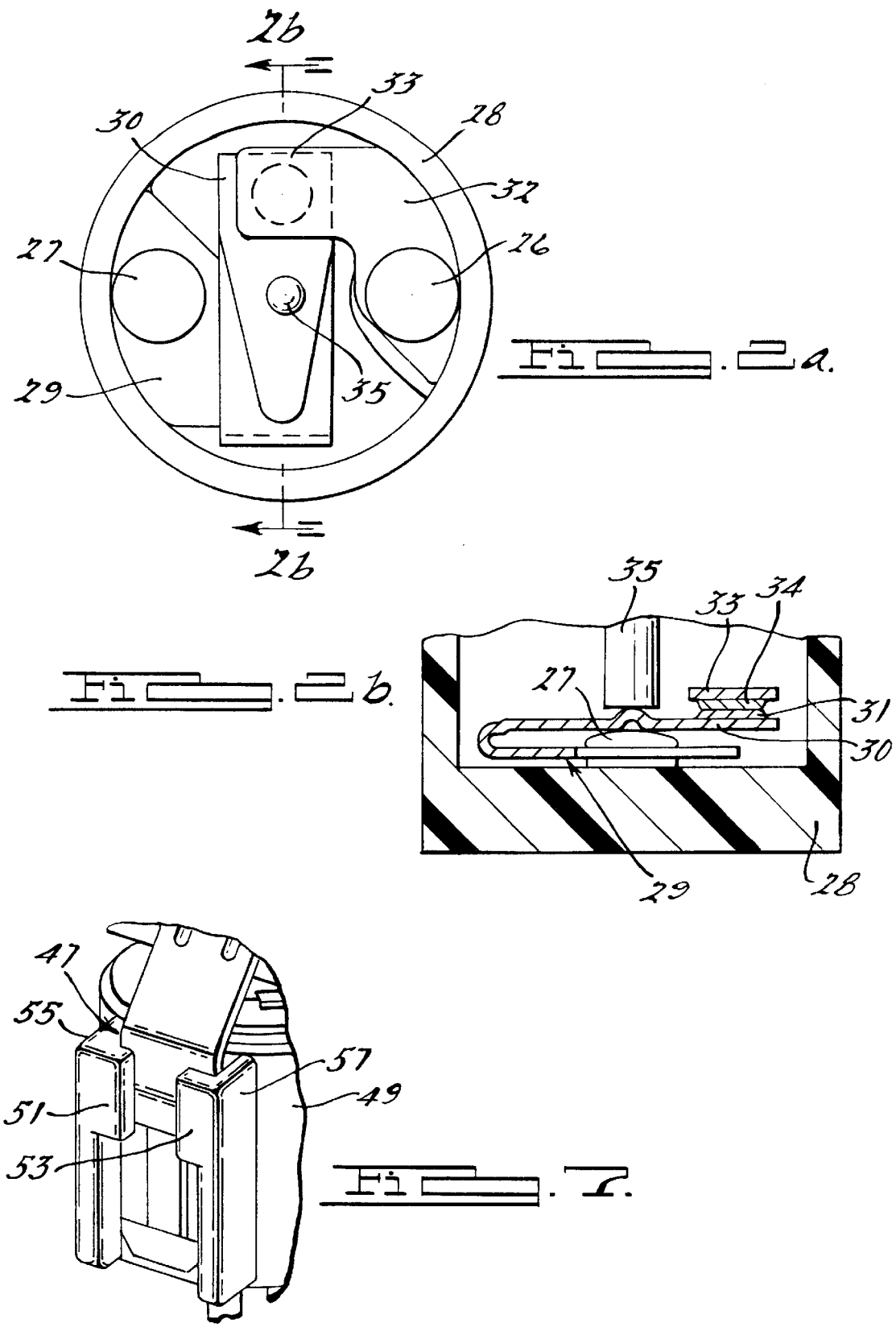

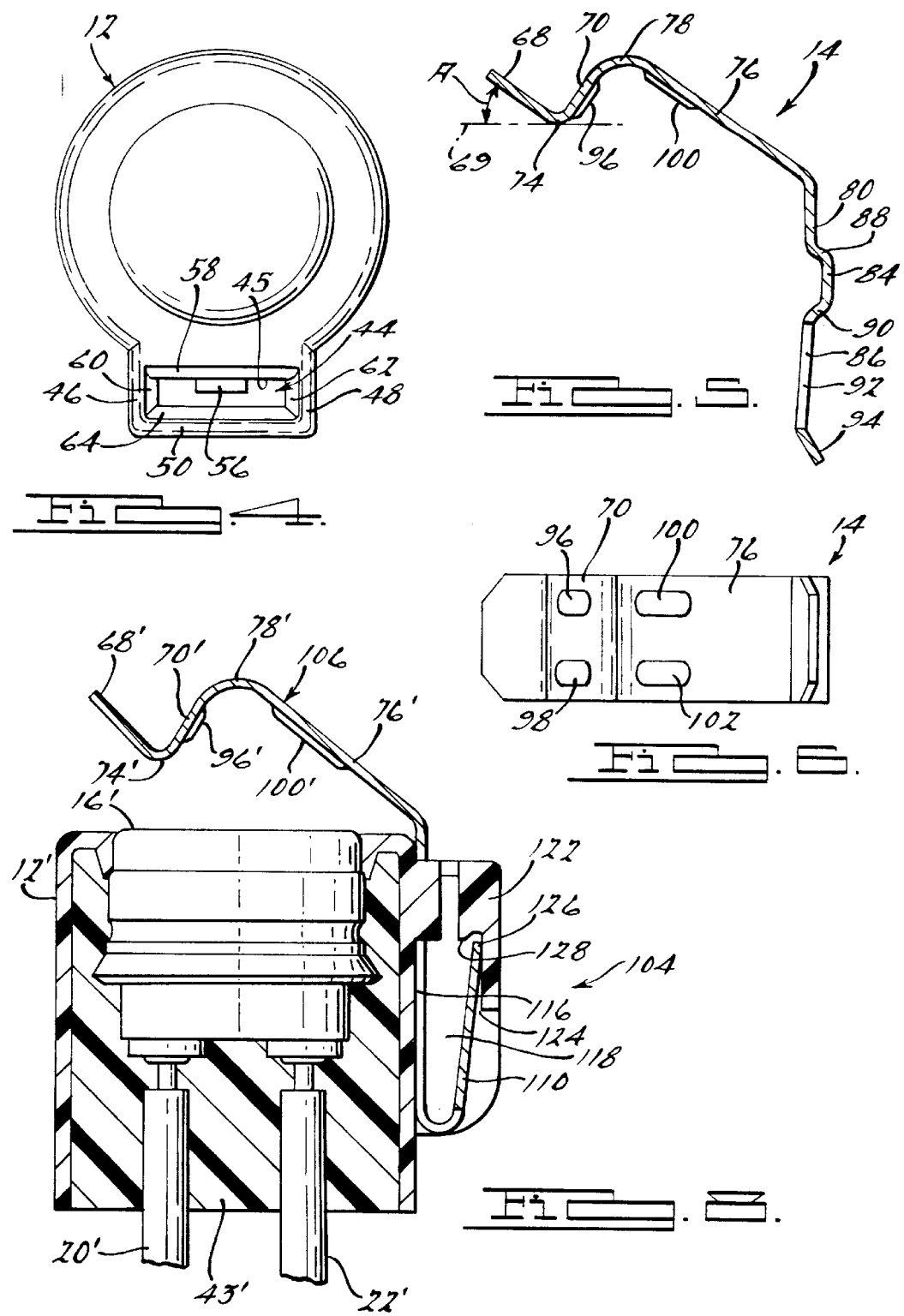

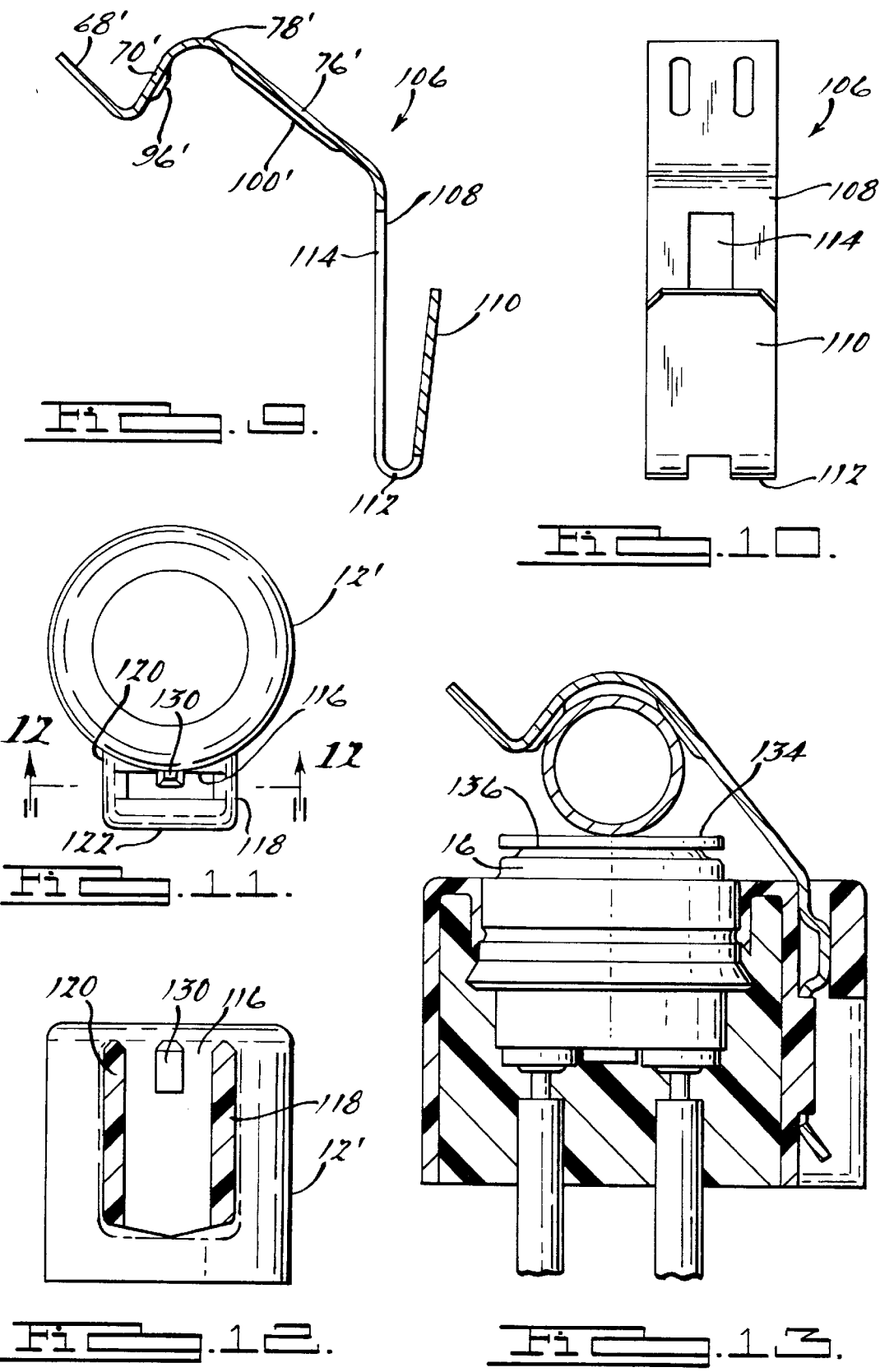

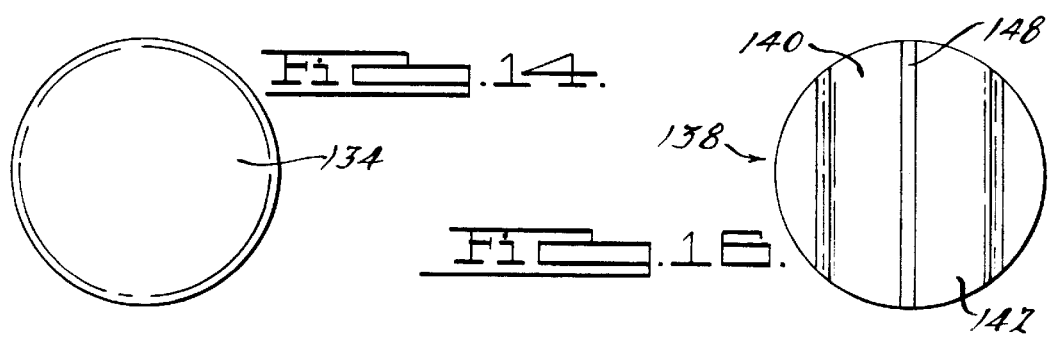
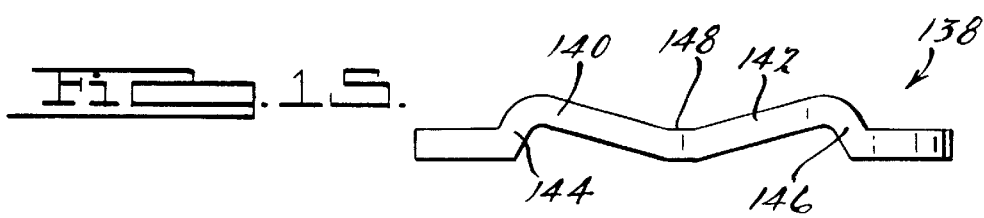
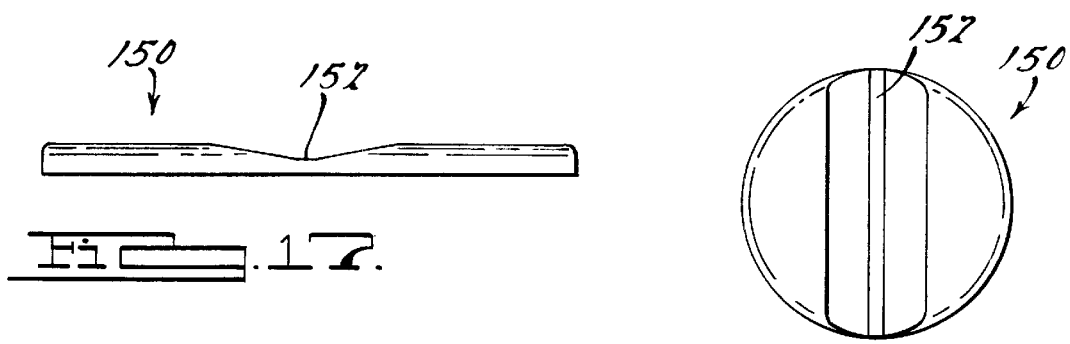
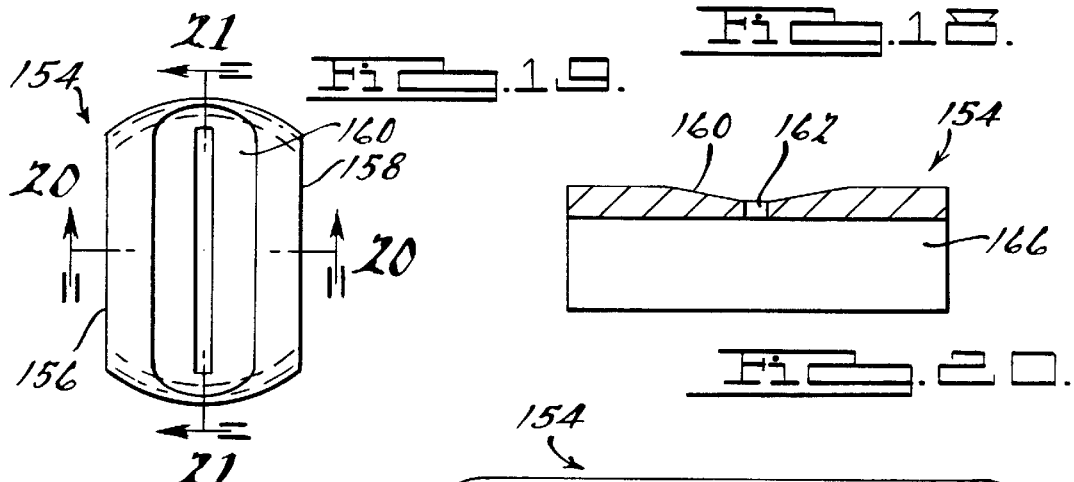

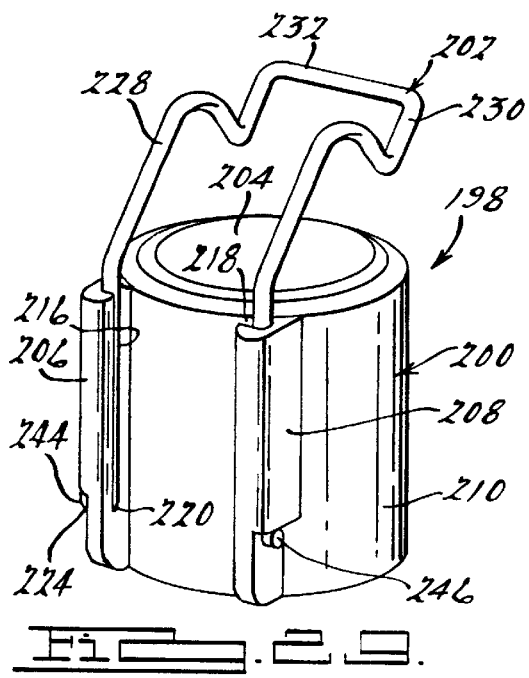
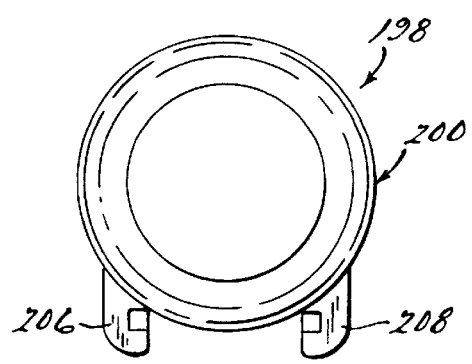
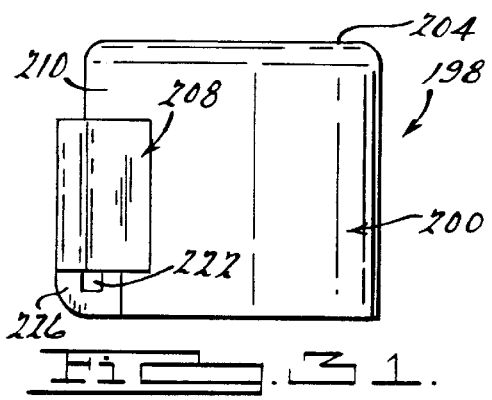
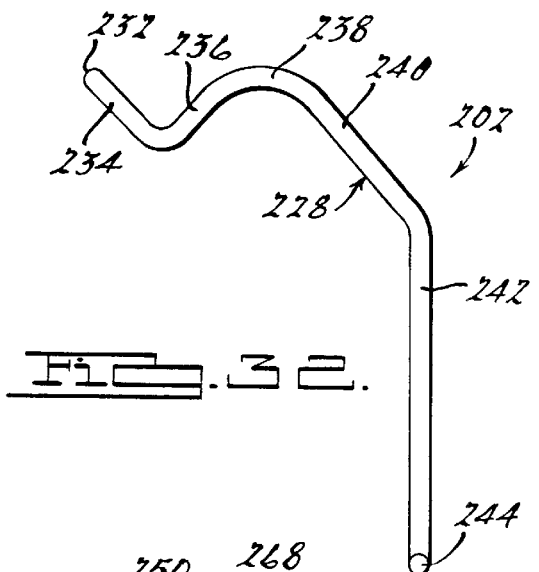
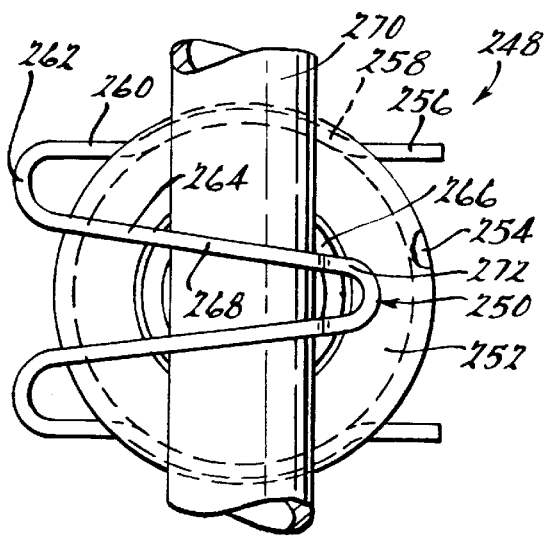
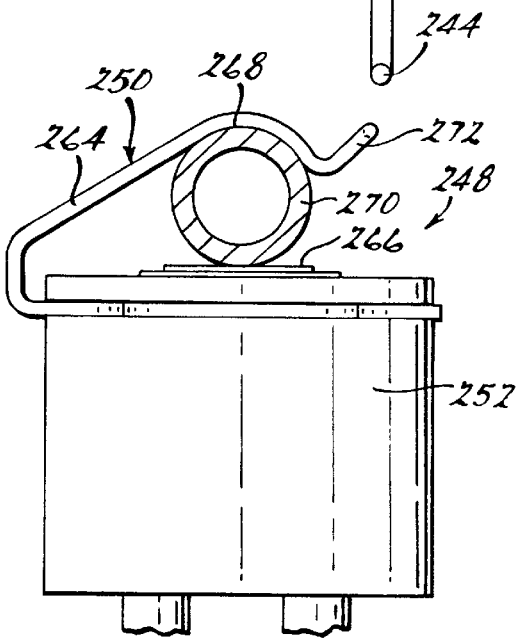

TEMPERATURE MONITORING ASSEMBLY HAVING A THERMOSTATIC CONTROL WITH MOUNTING CLIP

BACKGROUND AND SUMMARY OF THE INVENTION

The present invention relates generally to thermally responsive controls and more particularly to such controls incorporating improved mounting brackets or clips which are utilized to retain such thermal sensors in intimate heat transfer relationship with tubular or cylindrical members such as fluid conduits and the like.

There exist a wide variety of applications in which it is necessary or desirable to attach sensors to generally cylindrically shaped members such as for example in attachment of thermal sensors to fluid flow conduits. In such applications, it is highly desirable that the bracket or clip utilized to secure the sensor be designed to enable easy installation of the sensor on the tubular member but yet provide a high resistance to dislodgment of the sensor. It is also highly desirable that such mounting clips be designed for easy and convenient assembly to the sensor during the manufacture thereof thus avoiding the need for additional assembly operations by the end user of the sensor. It is also important that the mounting clip be designed so as to minimize the possibility of crevice corrosion which could result in damage to the conduit to which it is secured or degradation of the clip itself thus impairing its retention abilities. Further, in some applications, it is desirable to insulate the mounting clip itself from the conduit as well as to inhibit relative movement therebetween.

Accordingly, the present invention provides a thermally responsive sensor having an improved sensor mounting arrangement which offers the desirable advantages and features noted above. More specifically, the present invention provides mounting clips which are designed to be easily and conveniently assembled to the sensor during the manufacture thereof so as to provide the end user thereof with an easy to use unitary sensor assembly. Further, the mounting clips of the present invention are designed to facilitate quick and easy attachment of the sensor assembly to the fluid conduit yet provide a strong resistance to dislodgment from the conduit once assembled thereto. In one embodiment, embossments are provided on portions of the mounting clip to minimize surface contact between the conduit and clip thus reducing heat transfer through the clip as well as inhibiting crevice corrosion. In another embodiment, the area of the clip contacting the conduit may include pads, a coating or plated material to inhibit corrosion and/or resist relative movement of the sensor with respect to the clip. An optional protective cover is also disclosed which may be secured to the cap portion of the sensor to protect it from possible damage during shipment and/or assembly to the conduit. In yet another embodiment, the mounting clip is in the form of an open ended wire loop which includes leg portions adapted to be received in integrally molded channels provided on the sensor housing to enable easy and secure attachment of the clip to the sensor housing.

In each of these embodiments, the mounting clip of the present invention is specifically designed to facilitate easy fabrication thereof at very low cost while providing a secure means by which the sensor may be secured to a fluid conduit.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of a sensor incorporating a mounting clip secured thereto shown in operative relationship to a tubular member, all in accordance with the present invention;

FIG. 2 is a section view of the sensor assembly of FIG. 1, the section being taken along a diametrical plane extending through the longitudinal center of the mounting clip;

FIG. 2a is a section view showing the arrangement of the switch contacts within the switch case, the section being taken along line 2a—2a of FIG. 2;

FIG. 2b is a section view also showing the arrangements for the switch contacts within the switch case, the section being taken along lines 2b—2b of FIG. 2a;

FIG. 3 is an elevational view of the sensor of FIG. 1 as seen looking in the direction of arrow 3 in FIG. 1;

FIG. 4 is an elevational view of the sensor housing of FIG. 1, all in accordance with the present invention;

FIG. 5 is a longitudinal section view of the mounting clip shown in FIG. 1;

FIG. 6 is an elevational view of the mounting clip of FIG. 5;

FIG. 7 is a fragmentary perspective view showing a modified clip receiving pocket;

FIG. 8 is a section view similar to that of FIG. 2 but showing an alternative embodiment of the sensor, all in accordance with the present invention;

FIG. 9 is a longitudinal section view of the mounting clip of FIG. 8;

FIG. 10 is an elevational view of the mounting clip shown in FIG. 9;

FIG. 11 is an elevational view of the sensor housing forming a part of the embodiment shown in FIG. 8;

FIG. 12 is a section view of the sensor housing of FIG. 11, the section being taken along lines 12—12 thereof;

FIG. 13 is a view similar to that of FIG. 2 but showing a cup protector disc secured to the sensor cup, all in accordance with the present invention;

FIG. 14 is a plan view of the cup protector shown in FIG. 13;

FIGS. 15 and 16 are elevational and plan views respectively of an alternative cup protector in accordance with the present invention;

FIGS. 17 and 18 are elevational and plan views respectively of a further alternative cup protector in accordance with the present invention;

FIG. 19 is a plan view of yet another alternative cup protector in accordance with the present invention;

FIGS. 20 and 21 are section views of the protector disc of FIG. 19, the sections being taken along lines 20—20 and 21—21 respectively;

FIG. 29 is a view similar to that of FIG. 1 but showing a sensor having a modified mounting clip in accordance with the present invention;

FIGS. 30 and 31 are an end view and side view respectively of the sensor housing shown in FIG. 29;

FIG. 32 is an elevational view of the mounting clip shown in FIG. 29;

FIG. 33 is an end view of a further embodiment of the present invention; and

FIG. 34 is an elevational view of the embodiment of FIG. 33.

DESCRIPTION OF THE PREFERRED EMBODIMENTS

Figure 22:
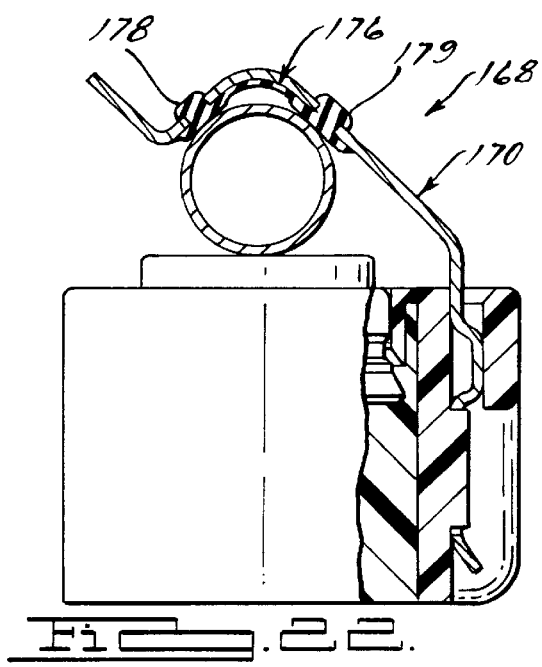
FIG. 22 is a section view similar to that of FIG. 2 but showing a mounting clip incorporating a snap-in saddle in accordance with the present invention.

Referring now to the drawings and more specifically to FIG. 1, there is shown a sensor 10 incorporating a housing 12 to which is secured a mounting bracket or clip 14. Sensor 10 is in the form of a thermally responsive switch and includes a metal cup 16 protruding slightly from one end of housing 12 which is to be positioned in thermally conductive relationship with a conduit 18, the exterior temperature of which is to be sensed. For example, conduit 18 may be a fluid conducting conduit utilized for conducting refrigerant in a refrigeration or air conditioning system although it should be noted that the present invention is well suited for use in attaching a wide variety of sensors to cylindrical or generally cylindrical members.

As best seen with reference to FIG. 2, sensor 10 includes a pair of electrical leads 20, 22 extending into housing 12 and connected to a pair of laterally spaced terminals 24, 25 which are riveted by two rivets 26, 27 to a switch case 28. A flexible conductive arm member 29 has one end secured to switch case 28 by rivet 27 and includes a diametrically extending spring arm portion 30 having a contact 31 provided at the movable free end thereof. A second conductive arm member 32 has one end secured to switch case 28 by rivet 26 and includes an arm portion 33 having a contact 34 provided thereon which is positioned in overlying engaging relationship with contact 31 provided on arm portion 30. An actuator rod 35 is in turn movably supported by an irregular generally disc shaped member 36 which is seated within cup member 16. A bimetal disc member 38 is disposed within a cavity defined between the end of cup member 16 and disc member 36 and has a downwardly facing concave surface against which actuator 34 is biased by conductive member 29. As noted above, when bimetal disc member 38 is in a condition with the concave surface facing downwardly as shown in FIG. 2, spring arm portion 30 will serve to support actuator 35 in engagement therewith and contacts 31 and 34 will be in electrically conductive engaging relationship. However, when bimetal disc member 38 snaps to a concave upwardly facing shape in response to a sensed temperature above a predetermined temperature, it will bias actuating rod 35 downwardly (as seen in FIG. 2) thereby moving spring arm portion 30 and contact 31 away from and out of engagement with contact 34. Switch case 28 and disc shaped member 36 are crimped within cup member 16 and this assembly is seated with the hollow interior of housing 12 which interior is thereafter filled with a suitable non-conductive potting material 43.

While sensor 10 as described above is in the form of a normally closed switch which opens in response to a sensed temperature in excess of (i.e., above or possibly below) a predetermined temperature, it may also take other forms such as for example a normally opened switch. Further, sensor 10 may be in the form of a device for sensing some other parameter associated with a tubular member.

Housing 12 is preferably formed from a suitable polymeric material and includes an integrally formed mounting clip retaining slot pocket 44 provided on a sidewall portion thereof. Slot 44 is defined by a generally planar outer wall portion 45 from which a pair of generally parallel radially outwardly extending circumferentially spaced wall portions 46 and 48 project which wall portions extend substantially the entire length of housing 12. Wall portions 46 and 48 are spaced apart a distance slightly greater than the width of clip 14. A wall portion 50 is integrally formed with and extends between respective walls 46 and 48 to thereby define slot 44. Preferably, wall portion 50 will have a length slightly less than half the length of sidewalls 46 and 48. Additionally, a generally rectangular shaped protrusion 56 is integrally formed on the sidewall 45 of housing 12, being substantially centered between walls 46 and 48 and extending downwardly from approximately the lower edge of wall portion 50. The upper edges of walls 45, 46, 48 and 50 are each provided with a beveled surface 58, 60, 62, and 64 respectively to facilitate insertion of clip 14.

With reference to FIG. 5, clip 14 is preferably formed from a single piece of suitably resilient metal such as stainless steel and comprises an elongated strip of a generally rectangular shape. Clip 14 includes a generally flat leading free end portion 68 which is formed at an acute included angle A relative to a plane 69 defined by the upper surface of cup 16 and serves to facilitate assembly of sensor 10 to the cylindrical member or fluid conduit. A second generally flat portion 70 is formed at an included angle of approximately 90° to free end portion 68 and is interconnected therewith by a relatively tightly radiused portion 74. A third generally planar portion 76 extends at an included angle of approximately 90° from portion 70 being interconnected thereto by a relatively large radiused portion 78. Extending from portion 76 is a further planar section 80 which is angled so as to extend substantially perpendicular to plane 69 defined by the top surface of cup 16 when clip 14 is assembled to housing 12. An offset portion 84 is provided being connected to portion 80 and a next adjacent substantially planar portion 86 by included wall portions 88 and 90. Planar portion 86 is angled slightly relative to a plane defined by portion 80 and includes a generally rectangular shaped opening 92 therein which, as best seen with reference to FIG. 3, has a width and length slightly greater than that of protrusion 56. The lower end portion 94 of clip 14 is angled outwardly slightly from the plane defined by portion 86 so as to provide a guide surface for guiding the clip over protrusion 56 during assembly. Additionally, the corners of portion 94 are preferably trimmed to aid in guiding clip 14 into slot 44 during assembly.

Referring again to FIGS. 5 and 6, portions 70 and 76 are each provided with a pair of laterally spaced longitudinally extending embossed ribs 96, 98, and 100, 102 respectively. Ribs 96, 98, 100, 102 are positioned and have a length such that they will provide the sole bearing surface of engagement with conduit 18 when sensor is assembled thereto. These ribs serve to minimize the surface contact between clip 14 and conduit 18 so as to reduce the possibility of crevice corrosion as well as to reduce heat transfer to the clip itself.

As shown in FIG. 2, as clip 14 is assembled within slot 44 of housing 12, angle end portion 94 will engage the upper edge of protrusion 56 thus guiding portion 86 up and over same until protrusion 56 is received within opening 92. Once fully assembled, protrusion 56 will provide a mechanical interlock with clip 14 to retain housing 12 and clip 14 in assembled relationship. Additionally, offset portion 84 will bear against wall 50 with the angulation of portion 86 providing a spring action to maintain this engagement as well as to maintain protrusion 56 seated within opening 92.

When sensor 10 is assembled to conduit 18, embossments 96, 98, 100, 102 will engage conduit 18 thereby urging and maintaining it in heat transfer engagement with the outer surface of cup 16 thus enabling sensor 10 to monitor the temperature thereof. Preferably, clip 14 will be designed to maintain at least a 5 pound gripping force on conduit 18 through the cantilevered support arrangement provided by the engagement of offset portion 84 with wall 50 and the engagement of portion 86 with surface 45 of housing 12. It should also be noted that clip 14 will preferably have a width approximately equal to the diameter of cup 16 and because it is positioned in overlying relationship thereto will offer some protection against damage to cup 16 during shipping, handling and installation of sensor 10. Additionally, the relatively small angulation of free end 68 with respect to plane 69 defined by the outer surface of cup 16 will facilitate easy assembly of sensor 10 to conduit 18 whereas the relatively large angulation of portion 70 relative to this same plane will render removal of sensor 10 from conduit 18 substantially more difficult thus greatly reducing the potential for accidental dislodgment of the sensor. Additionally, the provision of embossments 96, 98, 100 and 102 serve to concentrate the retention force exerted by clip 14 along 4 point or line contacts with the surface of conduit 18 thus reducing the possibility of slippage therebetween.

A modified clip receiving slot 47 is shown on housing 49 in FIG. 7 in which wall portion 50 of slot 44 is replaced by a pair of outer wall sections 51 and 53 integrally formed with and extending toward each other from respective circumferentially spaced wall portions 55 and 57. In all other respects, clip receiving retention slot 47 is substantially identical to clip receiving slot 44 described above.

Referring now to FIGS. 8–12, another embodiment of the present invention is shown being generally indicated by reference number 104. Sensor 104 is substantially identical to sensor 10 with the exception of the clip receiving pocket 44 and portions 80, 84, 86, 88, 90 and 94 of the clip 14. Portions of sensor 104 that are substantially identical to corresponding portions of sensor 10 are indicated by the same reference numbers primed.

In this embodiment, retention clip 106 includes an elongated generally planar portion 108 extending from portion 76' and a substantially planar return bend portion 110 connected to the lower end of portion 108 by a generously radiused portion 112. As best seen with reference to FIGS. 9 and 10 radiused portion 112 and planar portion 108 include an elongated slot or opening 114 substantially centered laterally and extending longitudinally through a major portion of the length of portion 108.

The clip receiving pocket provided on housing 12' includes substantially planar circumferentially extending outer wall portion 116 extending between a pair of elongated radially outwardly projecting circumferentially spaced sidewalls 118 and 120. An outer wall portion 122 extends between and interconnects the outer ends of wall portions 118 and 120 and has a length slightly more than half the length of sidewalls 118 and 120. Outer wall 122 has a reduced thickness lower portion that defines a recess 124 which is adapted to receive portion 110 of clip 106. A small notch 126 is provided in end surface 128 of recess 124 into which the terminal end of clip 106 is received with notch 126 serving to provide a mechanical interlock to retain clip 106 in position therein.

Outer wall portion 116 also includes an elongated protrusion 130 generally centered thereon which is adapted to be received in slot 114 and serve to guide clip 106 into the clip receiving pocket as well as to limit its movement into same. Thus, when assembled, protrusion 130 together with recess 124 will serve to limit relative longitudinal movement of clip 116 with respect to housing 14' whereas sidewalls 118, 120 will prevent relative angular rotational movement therebetween.

In all other respects, sensor 104 will provide substantially the same benefits and operate in substantially the same manner as set forth above with respect to sensor 10.

In some applications, it may be desirable to provide additional protection against damage or denting of outer cup 16. FIGS. 13 through 21 disclose several embodiments of protectors that may be utilized with any of the sensors disclosed herein to accommodate this objective.

With reference to FIGS. 13 and 14, a first embodiment of a protector is disclosed which protector is in the form of a circular disc 134 which is suitably secured to the outer surface 136 of cup 16 such as by welding, brazing, soldering or a suitable adhesive. Preferably, protector disc 134 will be fabricated from a highly thermally conductive material such as aluminum for example so as to minimize the effect of the increase in the length of the thermal transfer path to bimetal disc 38.

FIGS. 15 and 16 show an alternative embodiment of a protector disc 138. In this embodiment, disc 138 has a generally diametrically extending open V-shaped channel formed therein by deforming a slightly oval blank along chords thereof extending substantially perpendicular to the major axis of the blank to form two upwardly inclined side walls 140, 142 thereby creating two legs 144, 146 of the open V and a relatively narrow flat 148 at the juncture thereof. The V-shaped protector 138 is secured to the cup in the same manner as described above with respect to protector 134 and offers the advantages of a cradle to aid in properly positioning the sensor on the conduit as well as two lines of contact with the conduit for improved heat transfer.

A further variation of protector disc 138 is illustrated in FIGS. 17 and 18 being indicated by reference number 150. Protector disc 150 comprises a flat disc in which a diametrically extending V-shaped notch 152 is provided. This embodiment offers the advantages of full heat transfer surface contact with the top surface of cup 16 while also incorporating the locating and heat transfer advantages of protector disc 138.

Another embodiment of a protector disc is shown at 154 in FIGS. 19–21. This embodiment is similar to that of disc 150 but is trimmed along chords 156, 158 on opposite sides of the V groove 160. Additionally, a diametrical slot 162 is provided at the apex of the V groove and circumferentially extending depending flanges 164, 166 are provided at opposite ends of the groove. Depending flanges 164, 166 assist in positioning disc 154 with respect to cup 16 as it is being secured thereto whereas slot 162 and the trimmed chords aid in more rapid cooling of the bimetal disc 38 in response to a drop in the temperature of conduit 18 being sensed.

It should be noted that each of these protector discs will preferably be fabricated from a material having excellent heat transfer capabilities such as for example aluminum. Further, the protector discs may be secured to cup 16 in any suitable manner such as by welding, brazing or soldering or even by a suitable adhesive. It should also be noted that preferably the V groove will be structured so as to avoid excessively increasing the distance between the conduit and cup 16 while still being adapted to accommodate a relatively wide range of conduit diameters. Alternatively, any of the protector discs could be fabricated with a radiused groove in place of the V groove and the radius could also be selected to match the radius of the conduit thereby providing even greater heat transfer surface contact between the sensor and the conduit.

In some applications, it may be desirable to avoid even the limited direct contact of the clip with the conduit as is required by the embossments in the clip embodiments described above. Accordingly, such an alternative embodiment is illustrated in FIGS. 22–25 being indicated generally at 168.

Sensor 168 is substantially identical to sensor 10 described above except for the below noted modifications to the retaining clip 170 incorporated therein. Accordingly, corresponding portions thereof are indicated by the same reference numbers double primed.

Retaining clip 170 has a pair of openings 172, 174 centrally located on portions 70" and 76" thereof in place of embossments 96, 98, 100, 102. A saddle member 176 is provided which includes a pair of appropriately positioned projections 178 and 179 which are designed to be received within respective openings 172, 174 to secure saddle member to clip 170.

Figure 23:
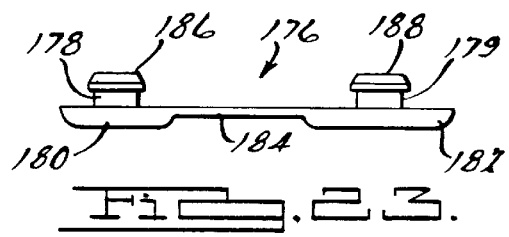
FIGS. 23 and 24 are elevational and plan views respectively of the snap-in saddle of FIG. 22.
Figure 24:
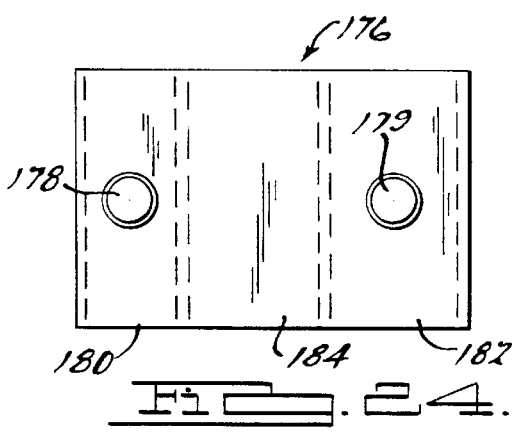
Figure 25:
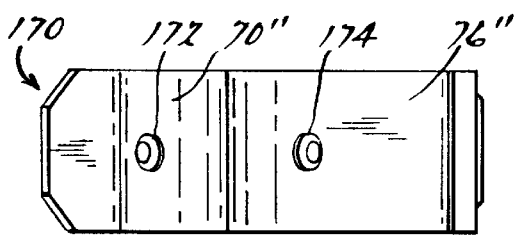
FIG. 25 is a top view of the clip shown in FIG. 22.

As best seen with reference to FIGS. 23 and 24, saddle member 176 is generally rectangular in shape and includes laterally extending relatively thick pad portions 180 and 182 adjacent opposite ends thereof and an interconnecting relatively thin web portion 184. Web portion 184 is positioned relative to thickened portions 180, 182 such that the backside of saddle member 176 is substantially planar with the exception of protrusions 178, 179. Further, protrusion 178 is generally centered on thickened portion 180 whereas protrusion 179 is generally centered on thickened portion 182. Each of the protrusions 178 and 179 includes an enlarged diameter head portion 186, 188 respectively which operate to overengage the outwardly facing surface of clip 170 to retain saddle member 176 in assembled relationship thereto.

Saddle member 176 is preferably integrally molded from a suitable polymeric material which will provide a reasonable degree of resiliency as well as relatively high frictional engagement with conduit 18 so as to both insulate clip against vibrations as well as to resist relative sliding movement between the sensor and conduit. Additionally, saddle member 176 also serves to reduce heat transfer to the surrounding environment via clip 170. Preferably saddle member 176 will have a width substantially equal to or slightly less than the width of clip 170 and a length sufficient such that thickened portions 180 and 182 will be suitably positioned for engagement with conduit 18 at spaced locations when sensor 168 is assembled thereto. Because saddle member 176 also serves to eliminate any metal to metal contact between clip 170 and the conduit to which it is mounted, it effectively eliminates any concern regarding crevice corrosion.

Figure 26:
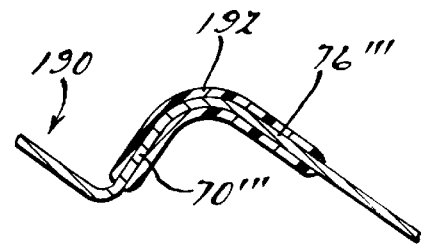
FIG. 26 is a fragmentary longitudinal section view showing an alternative embodiment of the mounting clip shown in FIG. 22, in accordance with the present invention.
Figure 27:
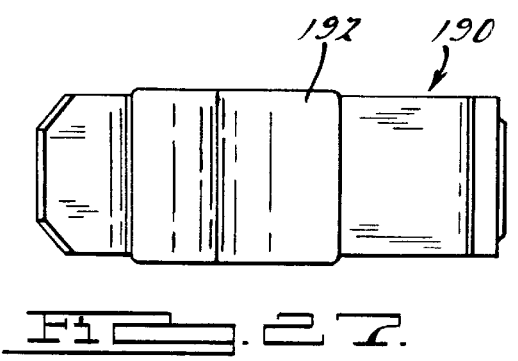
FIG. 27 is a plan view of the clip of FIG. 26.

As an alternative to saddle member 176, the conduit engaging section of portions 70'" and 76'" of clip 190 may be insulated by use of a heat shrink tubing or a suitable polymeric coating 192 applied as is shown in FIGS. 26 and 27. As the tubing or polymeric coating will completely surround the concerned sections of portions 70'" and 76'", openings 172 and 174 may be deleted from clip 190 if desired.

Figure 28:
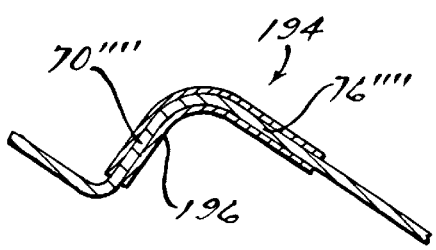
FIG. 28 is a view similar to that of FIG. 26 but showing an alternative embodiment in accordance with the present invention.

FIG. 28 illustrates a further alternative embodiment in which concerned sections of portions 70"" and 76"" of clip 194 are coated with a suitable paint or plated with a suitable material 196 if desired.

It should be noted that the saddle member, heat shrink tubing, polymeric coatings or plating concepts disclosed above may be applied to any of the retention clips disclosed herein.

Referring now to FIG. 29, there is shown a sensor 198 having a housing 200 to which is secured a wire retention clip 202. Housing 200 has disposed therein a sensor assembly substantially identical to that disclosed within housing 12 with cup 204 projecting outwardly from the upper end thereof.

As best seen with reference to FIGS. 30 and 31, housing 200 is generally cylindrical in shape and includes a pair of elongated substantially parallel circumferentially spaced projections 206, 208 extending outwardly from sidewall 210 thereof. Each of projections 206 and 208 includes facing sidewalls 212 and 214 within which outwardly opening elongated grooves 216, 218 are formed. Respective grooves 216, 218 open outwardly from the upper end of respective projections 206, 208 and extend downwardly to perpendicularly oppositely extending openings 220, 222 positioned adjacent to but spaced from the lower ends of projections 206, 208. Openings 220 and 222 each open outwardly through respective outer walls 224, 226 of projections 206, 208.

As shown in FIGS. 29 and 32, wire retention clip 202 is formed from a single elongated length of wire formed into an irregular generally U-shaped configuration including a pair of substantially identically shaped spaced legs 228, 230 and an outer interconnecting portion 232. As legs 228 and 230 are substantially mirror images of each other, only leg 228 will be described in detail, it being understood that leg 230 incorporates substantially identical portions.

Beginning from interconnecting portion 232, leg 228 includes a first upwardly angled portion 234 which forms an acute included angle relative to a plane defined by the upper surface of cup 204. A second relatively straight section 236 is connected to one end of section 234 by a relatively tightly radiused portion and extends upwardly therefrom at a second acute angle relative to a plane defined by the upper surface of cup 204. Preferably, section 234 will be at a lesser angle relative to the above referenced plane than section 236 thereby affording a lower required installation force and high removal force for assembling or disassembling sensor 198 from a conduit. A generously radiused portion 238 interconnects section 236 to a third relatively straight section 240. Preferably, the radius of portion 238 will be somewhat less than the radius of the conduit to which sensor 198 is to be assembled so as to provide for point contacts with the conduit only by respective sections 236 and 240 so as to minimize the potential for crevice corrosion.

A fourth relatively straight section 242 extends from section 240 and is angled with respect thereto such that it will extend substantially perpendicular to the plane defined by the upper surface of cup 204. The terminal ends 244, 246 of wire clip 202 at the lower ends of respective legs 228 and 230 are each bent outwardly in opposite directions at an angle of substantially 90° to portion 242 thereof.

In order to assemble wire clip 202 to housing 200, portions 242 of respective legs 228 and 230 are squeezed together slightly and ends 244, 246 inserted in respective openings 220 and 222 provided in housing 200 while leg portions 242 are positioned and received within respective grooves 216 and 218. The spring action between respective legs 228 and 230 will operate to retain wire clip 202 in assembled relationship with housing 200. If desired, grooves 216, 218 may be sized so as to provide a snap fit with leg portions 242. The function and operation of wire clip 202 will otherwise be substantially identical to that described above with reference to clips 14 and 106 and as noted above clip 202 may be utilized in conjunction with any of the protective discs disclosed above and may also incorporate a suitable coating or plating as described above or may have portions of respective legs 228, 230 encased in a suitable tubing also as disclosed above.

Referring now to FIGS. 33 and 34, another embodiment of a sensor 248 is shown incorporating another modified wire retention clip 250. In this embodiment, housing 252 is provided with an annular groove 254 adjacent its upper end for mounting of wire retention clip 250.

Wire retention clip 250 is also formed from an elongated single length of a suitable wire and has an irregular generally W-shaped form (when viewed in plan) which is generally symmetrical about a diametric plane extending parallel to the longitudinal axis of body 252. Accordingly, only one half of wire retention clip 250 will be described, it being understood that the other half will be the mirror image of the half described.

Wire clip 250 includes a relatively straight free end portion 256 extending to the left as shown in FIG. 33 to an arcuate section 258 which is designed to be received in annular groove 254. Preferably, arcuate portion 258 will have a radius of curvature substantially equal to the radius of housing 252 at the inner base of groove 254. Extending leftward (as shown) from arcuate portion 258 is a second generally straight portion 260 which connects to a generally U-shaped return bend portion 262. A third generally straight portion 264 extends from U-shaped portion 262 and extends upwardly into overlying relationship with respect to cup 266. A generously radiused portion 268 continues from straight portion 264 and is shaped to generally conform to the curvature of a conduit 272 to which sensor 248 is to be secured. Alternatively, portion 268 may have a radius less than that of conduit 268 so as to limit the surface contact therebetween. From portion 268 a generally straight portion 272 extends outwardly and in generally upwardly angled relationship to a plane defined by the upper surface of cup 266. Portion 270 also serves to interconnect the two halves of wire clips 250 at the midpoint thereof.

In order to assemble wire clip 250 to housing 252, respective end portions 256 are flexed apart slightly so as to allow arcuate portions 258 to move into annular groove 254. Thereafter, the spring action of clip 250 will serve to retain portion 258 in assembled relationship with groove 254 of housing 250. The remaining function and operation of wire retention clip 250 will be substantially the same as described above.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A temperature monitoring assembly adapted to be positioned in thermal sensing relationship to a tubular member comprising:
    a housing having a thermally responsive member disposed therein, said housing including a thermally conductive surface forming a part of the exterior surface of said housing, said surface being adapted to be positioned in thermal transfer relationship to said tubular member;
    a retention clip attachment provided on a sidewall of said housing and integrally formed with said housing, said retention clip attachment including a pair of substantially parallel elongated spaced wall portions and an integrally formed wall portion extending between said spaced wall portions in spaced relationship to said sidewall of said housing and;
    a retention clip mounted to said housing by said retention clip attachment, said retention clip having a free end portion supported in cantilevered overlying relationship to said thermally conductive surface and adapted to engage said tubular member so as to retain said thermally conductive surface in heat transfer relationship to said tubular member.

2. A temperature monitoring assembly as set forth in claim 1 wherein said thermally conductive surface is positioned on an end of said housing.

3. A temperature monitoring assembly as set forth in claim 1 wherein said retention clip is adapted to engage said tubular member at a plurality of points.

4. A temperature monitoring assembly as set forth in claim 1 wherein said free end portion of said retention clip includes a first portion positioned at a first acute angle with respect to a plane extending parallel with said thermally conductive surface, said angle being chosen to facilitate assembly of said assembly to said tubular member.

5. A temperature monitoring assembly as set forth in claim 4 wherein said retention clip includes a second portion immediately adjacent said free end portion, said second portion extending at a second angle relative to said plane, said second angle being greater than said first angle whereby the force required to install said assembly on said tubular member is less than the force required to remove said assembly from said tubular member.

6. A temperature monitoring assembly as set forth in claim 1 wherein said retention clip includes a friction enhancing surface adapted to be engageable with said tubular member.

7. A temperature monitoring assembly as set forth in claim 6 wherein said friction enhancing surface comprises a saddle member secured to said clip.

8. A temperature monitoring assembly as set forth in claim 6 wherein said friction enhancing surface comprises a coating applied to said clip.

9. A temperature monitoring assembly as set forth in claim 1 wherein said thermally conductive surface comprises a cup shaped member forming a part of said housing and further comprising a thermally conductive protective disc secured to an outer surface of said cup shaped member.

10. A temperature monitoring assembly as set forth in claim 9 wherein said protective disc includes a generally V-shaped groove adapted to receive said tubular member.

11. A temperature monitoring assembly as set forth in claim 1 wherein said retention clip is formed from an elongated metal strip.

12. A temperature monitoring assembly as set forth in claim 1 wherein said retention clip is formed from a wire.

13. A temperature monitoring assembly adapted to be attached to a tubular member for sensing a temperature of said tubular member, said assembly comprising:
    a housing having a thermally responsive member disposed therein and including a thermally conductive surface forming a part of the exterior surface of said housing, said surface being adapted to be supported in heat transfer relationship to said tubular member;
    a mounting clip retention slot integrally formed on said exterior surface of said housing, said retention slot being defined by a pair of elongated sidewalls extending outwardly in spaced parallel relationship from said exterior surface, and an outer wall portion extending at least partially between said sidewalls;

an elongated retention clip having a first end portion disposed in said retention slot and a second free end portion supported in cantilevered overlying spaced relationship to said thermally conductive surface, said free end portion including first and second portions interconnected by a radiused portion, said first and second portions being adapted to engage said tubular member at circumferentially spaced locations and said radiused portion having a radius of curvature less than the radius of said tubular member.

14. A temperature monitoring assembly as set forth in claim 13 wherein said clip retention slot includes a locking portion adapted to cooperate with said first end portion of said retention clip to form a mechanical interlock to retain said first end portion within said pocket.

15. A temperature monitoring assembly as set forth in claim 14 wherein said locking portion comprises a protrusion formed on said exterior surface and projecting into said slot.

16. A temperature monitoring assembly as set forth in claim 15 wherein said protrusion is received within an opening provided in said first portion of said retention clip.

17. A temperature monitoring assembly as set forth in claim 16 wherein said clip retention slot is defined by an outer wall portion extending between respective ones of said sidewalls and said first portion includes an offset section bearing against said outer wall portion.

18. A temperature monitoring assembly as set forth in claim 16 wherein said clip retention slot is defined by a pair of outer wall portions extending toward each other from respective ones of said sidewalls and said first portion includes an offset section bearing against said pair of outer wall portions.

19. A temperature monitoring assembly as set forth in claim 13 wherein said first and second portions of said free end portion include longitudinally extending embossments, said embossments being positioned to engage said tubular member when said assembly is attached to said tubular member.

20. A temperature monitoring assembly as set forth in claim 13 wherein said first end portion is generally U-shaped and said outer wall portion extends entirely between said sidewalls.

21. A temperature monitoring assembly as set forth in claim 20 wherein said outer wall portion includes a recess, and wherein a terminal end of said first end portion is received within said recess to mechanically lock said first end portion in said slot.

22. A temperature monitoring assembly as set forth in claim 13 wherein said first and second portions of said free end portion include a resilient material on a surface thereof, said resilient material being positioned so as to engage said tubular member when said assembly is attached thereto.

23. A temperature monitoring assembly as set forth in claim 22 wherein said resilient material is in the form of a saddle member secured to said first and second portions, said saddle member including first and second engagement portions and an interconnecting web.

24. A temperature monitoring assembly as set forth in claim 23 wherein said saddle member includes a pair of projections provided on one side thereof, said projections being received within openings provided in said first and second portions of said free end portion to retain said saddle member in assembled relationship with said retention clip.

25. A temperature monitoring assembly as set forth in claim 22 wherein said resilient material surrounds said first and second portions.

26. A temperature monitoring assembly as set forth in claim 13 wherein said assembly further includes a protective disc secured in overlying relationship to said thermally conductive surface.

27. A temperature monitoring assembly as set forth in claim 26 wherein said protective disc includes a diametrically extending V-groove adapted to receive said tubular member.

28. A temperature monitoring assembly as set forth in claim 27 wherein said V-groove is formed on one surface of said protective disc and an opposite surface of said disc is substantially planar.

29. A temperature monitoring assembly as set forth in claim 27 wherein said protective disc is secured to said thermally conductive surface by welding.

30. A temperature monitoring assembly as set forth in claim 28 wherein said protective disc includes a pair of circumferentially extending depending peripheral flange portions.

31. A temperature monitoring assembly adapted to be attached to a tubular member for sensing a temperature of said tubular member, said assembly comprising:

a housing having a thermally responsive member disposed therein, said housing including a thermally conductive surface forming a part of the exterior surface of said housing;

a protective disc secured in overlying relationship to said thermally conductive surface to resist damage to said thermally conductive surface;

a retention clip adapted to attach said assembly to said tubular member with said protective disc in thermally conductive relationship to said tubular member and;

means for attaching said retention clip to said housing, said means for attaching comprising a clip receiving pocket provided on said housing, said clip receiving pocket comprising a circumferentially extending first wall, a pair of elongated, radially outwardly projecting, circumferentially spaced sidewalls and a second wall interconnecting with said sidewalls.

32. A temperature monitoring assembly as set forth in claim 31 wherein said protective disc has a V-shaped groove provided therein, said tubular member being received within said V groove when said assembly is attached to said tubular member.

33. A temperature monitoring assembly as set forth in claim 31 wherein said protective member overlies substantially the entire thermally conductive surface provided on said housing.

34. A temperature monitoring assembly as set forth in claim 31 wherein said protective disc includes a pair of spaced circumferentially extending depending peripheral flanges operative to assist in positioning said protective disc on said thermally conductive surface.

35. A temperature monitoring assembly as set forth in claim 31 wherein said retention clip includes a first end portion attached to said housing and a second free end portion supported in cantilevered relationship to said protective disc, said second free end portion being operative to overengage said tubular member to retain said tubular member in engagement with said protective disc when said assembly is attached to said tubular member.

36. A temperature monitoring assembly as set forth in claim 35 wherein said second free end portion includes first and second sections interconnected by a radiused portion, said first and second sections being adapted to engage said tubular member.

37. A temperature monitoring assembly as set forth in claim 36 wherein said first and second sections include a friction enhancing surface for engagement with said tubular member to resist relative movement between said assembly and said tubular member.

38. A temperature monitoring assembly as set forth in claim 37 wherein said friction enhancing surface comprises a friction coating applied to said first and second portions.

39. A temperature monitoring assembly as set forth in claim 37 wherein said friction enhancing surface comprises engagement pads secured to said first and second sections.

40. A temperature monitoring assembly as set forth in claim 39 wherein said pads are interconnected by a web portion to form a saddle member, said saddle member being integrally formed from a polymeric composition.

41. A temperature monitoring assembly as set forth in claim 37 wherein said friction enhancing surface is plated on said first and second sections.

42. A temperature monitoring assembly adapted to be attached to a tubular member for sensing a temperature of said tubular member, said assembly comprising:
    a housing including a thermally conductive exterior surface, a pair of circumferentially spaced elongated wall portions projecting outwardly from said exterior surface, a longitudinally extending groove formed in each of said wall portions; and
    a wire clip for attaching said assembly to said tubular member, said wire clip including a first portion adapted to engage said tubular member and retain it in thermally conductive relationship to said thermally conductive surface and a second portion for attaching said wire clip to said housing, said second portion of said wire clip including a pair of spaced leg portions, one of said leg portions being received within each of said grooves.

43. A temperature monitoring assembly as set forth in claim 42 wherein each of said sidewalls includes a laterally extending opening, each of said leg portions including a terminal end extending into said opening to mechanically lock said clip in assembled relationship with said housing.

44. A temperature monitoring assembly as set forth in claim 42 wherein at least parts of said first portion of said retention clip have a friction enhancing surface provided thereon.

45. A temperature monitoring assembly as set forth in claim 44 wherein said friction enhancing surface comprises a coating of said parts.

46. A temperature monitoring assembly as set forth in claim 42 wherein said first portion includes first, second, and third serially interconnected parts, said first part being positioned at a first acute included angle relative to a plane extending parallel to said thermally conductive surface, said second part being positioned at a second acute included angle relative to said plane, said second angle being greater than said first angle whereby a lower force is required to attach said assembly to said tubular member than is required to remove said assembly from said tubular member, said second and third parts being adapted to engage said tubular member and to retain said tubular member in thermal transfer relationship with said thermally conductive surface.

47. A temperature monitoring assembly as set forth in claim 46 wherein said second and third parts are interconnected by a radiused part, said radiused part having a radius of curvature less than the radius of said tubular member.

* * * * *